United States Patent
Christensen

(10) Patent No.: US 10,403,133 B1
(45) Date of Patent: Sep. 3, 2019

(54) VEHICLE ROADWAY TRAFFIC DENSITY MANAGEMENT SYSTEMS FOR OPTIMIZING VEHICLE SPACING

(71) Applicant: STATE FARM MUTUAL AUTOMOBILE INSURANCE COMPANY, Bloomington, IL (US)

(72) Inventor: Scott T. Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 84 days.

(21) Appl. No.: 15/661,572

(22) Filed: Jul. 27, 2017

(51) Int. Cl.
| | |
|---|---|
| G05D 1/00 | (2006.01) |
| G05D 3/00 | (2006.01) |
| G06F 7/00 | (2006.01) |
| G06F 17/00 | (2019.01) |
| G08G 1/01 | (2006.01) |
| G07C 5/08 | (2006.01) |
| G07C 5/00 | (2006.01) |
| G01C 21/34 | (2006.01) |

(52) U.S. Cl.
CPC ....... *G08G 1/0145* (2013.01); *G01C 21/3415* (2013.01); *G07C 5/008* (2013.01); *G07C 5/085* (2013.01); *G08G 1/0112* (2013.01); *G08G 1/0133* (2013.01)

(58) Field of Classification Search
CPC .. G08G 1/0145; G08G 1/0112; G08G 1/0133; G01C 21/3415; G07C 5/008; G07C 5/085
See application file for complete search history.

(56) References Cited

U.S. PATENT DOCUMENTS

| | | | | |
|---|---|---|---|---|
| 2016/0004915 A1* | 1/2016 | Chen | ................. | G06K 9/00791 348/149 |
| 2016/0132705 A1* | 5/2016 | Kovarik | ............ | G06K 7/10376 340/10.3 |
| 2016/0347327 A1* | 12/2016 | Kondo | .................. | B60W 50/14 |
| 2017/0050638 A1* | 2/2017 | Gordon | ................. | B60W 30/16 |
| 2017/0113687 A1* | 4/2017 | Gordon | ................. | H04W 4/046 |
| 2017/0146359 A1* | 5/2017 | Hsu | ..................... | G01C 21/3667 |
| 2017/0169366 A1* | 6/2017 | Klein | ................... | G06Q 10/025 |
| 2017/0197626 A1* | 7/2017 | Jammoussi | .......... | G05D 1/0061 |
| 2017/0345309 A1* | 11/2017 | Bostick | ................. | G08G 1/166 |
| 2018/0060827 A1* | 3/2018 | Abbas | ................... | G05D 1/0088 |
| 2018/0099676 A1* | 4/2018 | Goto | ..................... | B60W 30/10 |
| 2019/0025819 A1* | 1/2019 | Ferguson | ............. | G05D 1/0027 |
| 2019/0025820 A1* | 1/2019 | Ferguson | ............... | G08G 1/143 |

* cited by examiner

*Primary Examiner* — Mussa A Shaawat
(74) *Attorney, Agent, or Firm* — Marshall, Gerstein & Borun LLP; Randall G. Rueth

(57) ABSTRACT

Systems and methods are provided that may automatically vary a speed of autonomous vehicles and/or a following distance between autonomous vehicles. The systems and methods may, thereby, maintain an optimal vehicle roadway traffic flow, for example, between a "free flow" and a "wide moving jam." Furthermore, the systems and methods may generate data representative of autonomous vehicle related emergencies based on data representative of an autonomous vehicle operating environment.

26 Claims, 11 Drawing Sheets

VEHICLE ROADWAY TRAFFIC DENSITY MANAGEMENT SYSTEMS FOR OPTIMIZING VEHICLE SPACING

TECHNICAL FIELD

The present disclosure generally relates to vehicle roadway traffic density management systems. In particular, the present disclosure relates to vehicle roadway traffic density management systems that optimize autonomous vehicle spacing.

BACKGROUND

Vehicle roadways are becoming more congested, especially on roadways within large cities. Often times, vehicle roadway traffic is either too dense or too sparse. In either event, spacing between associated vehicles is not managed in an effective manner, let alone optimized. Traffic congestion often results in vehicles oscillating between a complete stop and legal speed limit travel (i.e., often referred to as a "slinky" effect). Because vehicle roadways are becoming more congested, and vehicles are starting and stopping due to variable spacing between vehicles, vehicle accidents are increasing.

Managing vehicle roadway traffic density would improve vehicle safety. In particular, a vehicle roadway traffic density management system that optimizes spacing between leading and trailing vehicles, would reduce vehicles oscillating between a complete stop and legal speed limit travel. As a result, the potential for vehicle accidents would be reduced.

Autonomous vehicles are being developed that are substantially automated or completely automated, resulting in vehicles that may operate with little or no input from a human. Autonomous vehicles are equipped with sensors and communications systems that enable geographic location tracking of the autonomous vehicles, and detection of other vehicles and objects proximate the autonomous vehicles.

There is an opportunity for vehicle roadway traffic density management systems and methods that automatically optimize the spacing between and among autonomous vehicles on roadways, relative to other autonomous vehicles and/or non-autonomous vehicles. More particularly, there is an opportunity for vehicle roadway traffic density management systems and methods that automatically control operation of autonomous vehicles to maintain optimal spacing relative to leading and trailing vehicles.

SUMMARY

A vehicle roadway traffic density management system may include a transceiver configured to communicate via at least one communication network, a memory storing a set of computer-executable instructions, and a processor interfacing with the transceiver and the memory. The processor may be configured to execute the set of computer-executable instructions to cause the processor to receive, via the transceiver, autonomous vehicle schedule data associated with an autonomous vehicle from at least one of: a schedule entry device, a remote server, or a vehicle device, wherein the autonomous vehicle schedule data is representative of at least one of: an autonomous vehicle current geographic location, an autonomous vehicle driving route, or an autonomous vehicle geographic destination. Execution of the set of computer-executable instructions by the processor may also cause the processor to receive, via the transceiver, roadway geographic map data from a remote server. The roadway geographic map data may be representative of various roadways that extend between the autonomous vehicle current geographic location and the autonomous vehicle geographic destination. Execution of the set of computer-executable instructions by the processor may further cause the processor to receive, via the transceiver, vehicle real-time operation data from at least one of: a vehicle, or a remote server. The vehicle real-time operation data may be representative of an a vehicle current geographic location, a vehicle driving route, a vehicle geographic destination, or a vehicle speed. Execution of the set of computer-executable instructions by the processor may yet further cause the processor to generate autonomous vehicle operation data based on the autonomous vehicle schedule data, the roadway geographic map data, and the vehicle real-time operation data. Execution of the set of computer-executable instructions by the processor may also cause the processor to transmit, via the transceiver, the autonomous vehicle operation data to the autonomous vehicle. Operation of the autonomous vehicle may be automatically controlled according to the autonomous vehicle operation data.

In another embodiment, a non-transitory computer-readable medium may include computer readable instructions that, when executed by a processor, may cause the processor to implement a vehicle roadway traffic density management system. The non-transitory computer-readable medium may include an autonomous vehicle schedule data receiving module that, when executed by a processor, may cause the processor to receive autonomous vehicle schedule data associated with an autonomous vehicle from at least one of: a schedule entry device, a remote server, or a vehicle device. The autonomous vehicle schedule data may be representative of at least one of: an autonomous vehicle current geographic location, an autonomous vehicle driving route, or an autonomous vehicle geographic destination. The non-transitory computer-readable medium may also include a roadway geographic map data receiving module that, when executed by a processor, may cause the processor to receive roadway geographic map data from a remote server. The roadway geographic map data may be representative of various roadways that extend between the autonomous vehicle current geographic location and the autonomous vehicle geographic destination. The non-transitory computer-readable medium may further include a vehicle real-time operation data receiving module that, when executed by a processor, may cause the processor to receive vehicle real-time operation data from at least one of: a vehicle, or a remote server. The vehicle real-time operation data may be representative of an a vehicle current geographic location, a vehicle driving route, a vehicle geographic destination, or a vehicle speed. The non-transitory computer-readable medium may yet further include an autonomous vehicle operation data generation module that, when executed by a processor, may cause the processor to generate autonomous vehicle operation data based on the autonomous vehicle schedule data, the roadway geographic map data, and the vehicle real-time operation data. An autonomous vehicle may be automatically operated based on the autonomous vehicle operation data.

In yet a further embodiment, a vehicle roadway traffic density management method may include receiving, at a processor of a computing device, autonomous vehicle schedule data associated with an autonomous vehicle from at least one of: a schedule entry device, a remote server, or a vehicle device, in response to the processor executing an autonomous vehicle schedule data receiving module. The autonomous vehicle schedule data may be representative of at least one of: an autonomous vehicle current geographic location, an autonomous vehicle driving route, or an autonomous vehicle geographic destination. The method may also include receiving, at a processor or a computing device, roadway geographic map data from a remote server, in response to the processor executing a roadway geographic map data receiving module. The roadway geographic map data may be representative of various roadways that extend between the autonomous vehicle current geographic location and the autonomous vehicle geographic destination. The method may further include receiving, at a processor of a computing device, vehicle real-time operation data from at least one of: a vehicle, or a remote server, in response to the processor executing a vehicle real-time operation data receiving module. The vehicle real-time operation data may be representative of an a vehicle current geographic location, a vehicle driving route, a vehicle geographic destination, or a vehicle speed. The method may yet further include generating, using a processor of a computing device, autonomous vehicle operation data based on the autonomous vehicle schedule data, the roadway geographic map data, and the vehicle real-time operation data, in response to the processor executing an autonomous vehicle operation data generation module. An autonomous vehicle may be automatically operated based on the autonomous vehicle operation data.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Systems and methods are provided that automatically maintain an optimal vehicle density for autonomous vehicles operating on associated roadways. For example, the systems and methods may automatically vary an autonomous vehicle speed and/or an autonomous vehicle following distance, between and among autonomous vehicles and/or non-autonomous vehicles, in order to maintain a vehicle spacing between a "free flow" of vehicles and a "wide moving jam" of vehicles.

More particularly, the systems and methods of the present disclosure may generate autonomous vehicle operation data based on, for example, autonomous vehicle schedule data (e.g., a current geographic location, a desired destination, whether the passenger is willing to accept a route that is other than a route associated with a least time to the destination, a time constraint, etc.), vehicle real-time operation data (e.g., autonomous vehicle speed, an autonomous vehicle steering wheel angle, activation of an autonomous vehicle brake, activation of an autonomous vehicle throttle, a current autonomous vehicle geographic location, a desired autonomous vehicle geographic location, etc.), roadway infrastructure data (e.g., roadway construction data, roadway detour data, roadway accident data, roadway vehicle detection sensor data, etc.), autonomous vehicle roadway infrastructure data (e.g., roadway environment as detected by vehicle sensors, roadway conditions as detected by vehicle sensors, etc.), roadway geographic map data, any sub-combination thereof, or a combination thereof. The systems and methods may automatically operate a plurality of autonomous vehicles based on the autonomous vehicle operation data to, for example, maintain optimal spacing between leading and trailing vehicles.

By automatically maintaining optimal vehicle density, the systems and methods of the present disclosure may reduce traffic congestion, improve travel time, and reduce traffic accidents, among other benefits.

Exemplary Traffic Density Environment

Figure 1A:
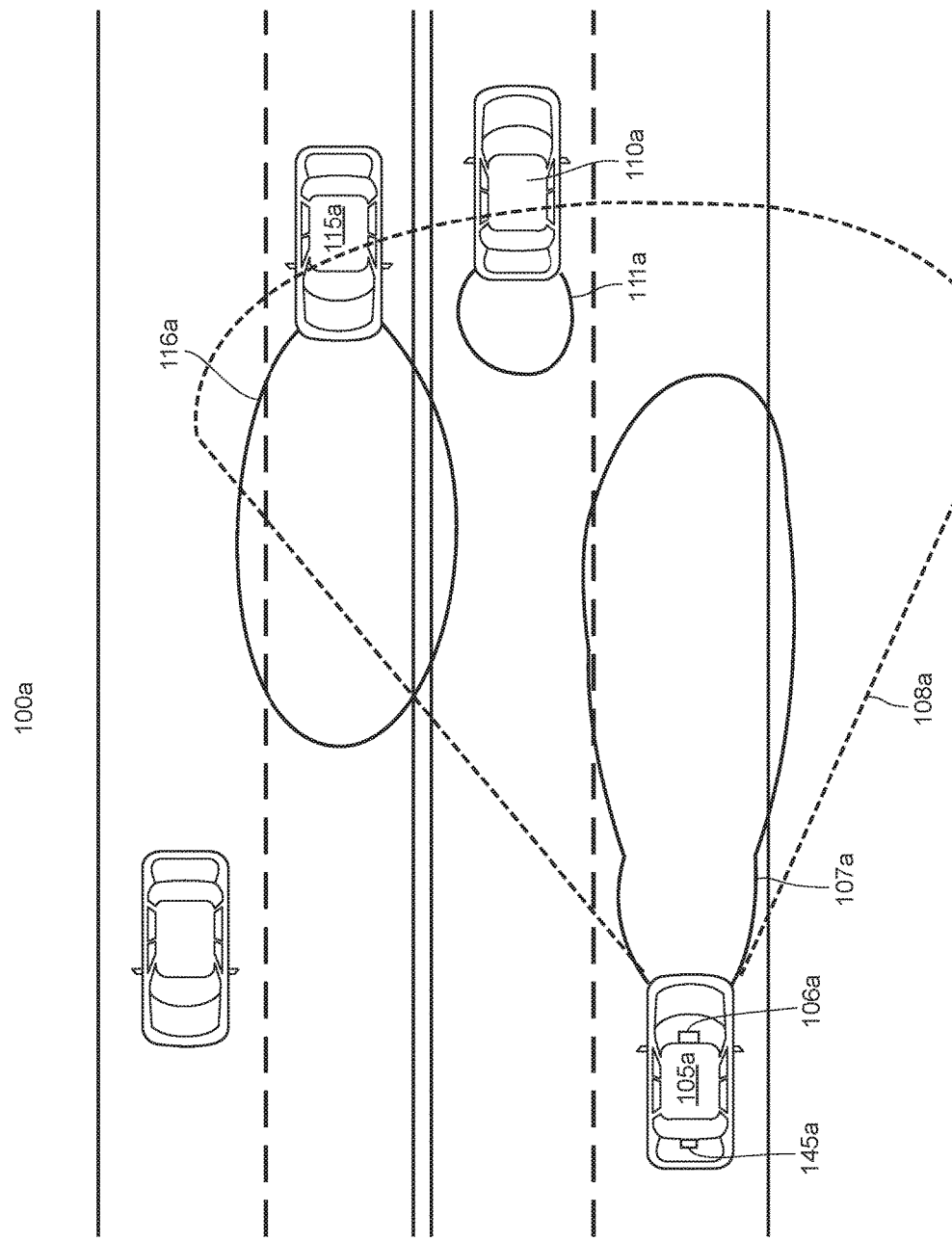
FIGS. 1A and 1B depict example vehicle roadway operating environments of an autonomous vehicle.

Turning to FIG. 1A, an example four-lane highway operating environment 100a is depicted that illustrates an autonomous vehicle 105a driving in a right-hand lane, a leading vehicle 110a driving in a left-hand lane and traveling in the same direction as the autonomous vehicle 105a, and an oncoming vehicle 115a driving in a left-hand lane and traveling in an opposite direction compared to the autonomous vehicle 105a. While not included in FIG. 1A, it should be understood that other vehicles (e.g., other autonomous vehicles and/or other non-autonomous vehicles) may be driving in either right-hand lane and traveling in the same direction as the autonomous vehicle 105a and/or other vehicles (e.g., other autonomous vehicles and/or other non-autonomous vehicles) may be driving in either left-hand lane and traveling in an opposite direction compared to the autonomous vehicle 105a.

As further reflected in FIG. 1A, the lanes of traffic (e.g., the two right-hand lanes and the two left-hand lanes) may be separated by a center-line. In any event, the autonomous vehicle 105a may include interior rearview mirror/sensor(s) 106a and rearward sensor(s) 145a that may provide real-time data to an autonomous vehicle computer (not shown in FIG. 1A). The real-time data may be, for example, representative of the operating environment 100a. For example, the interior rearview mirror/sensor(s) 106a may include at least one forward facing sensor (e.g., at least one ultra-sonic sensor, at least one radar sensor, at least one LIDAR sensor, at least one image sensor, etc.). Thereby, the interior rearview mirror/sensor(s) 106a may provide data representative of objects (e.g., another autonomous vehicle or a non-autonomous vehicle) within a field of view 107a in front of the autonomous vehicle 105a and/or data representative of objects (e.g., a leading vehicle 110a and oncoming vehicle 115a) in a broader field of view 108a. The interior rearview mirror/sensor(s) 106a may further provide real-time data that represents when the autonomous vehicle 105a is within a danger zone 111a associated with the leading vehicle 110a or within a danger zone 116a associated with the oncoming vehicle 115a.

Figure 1B:
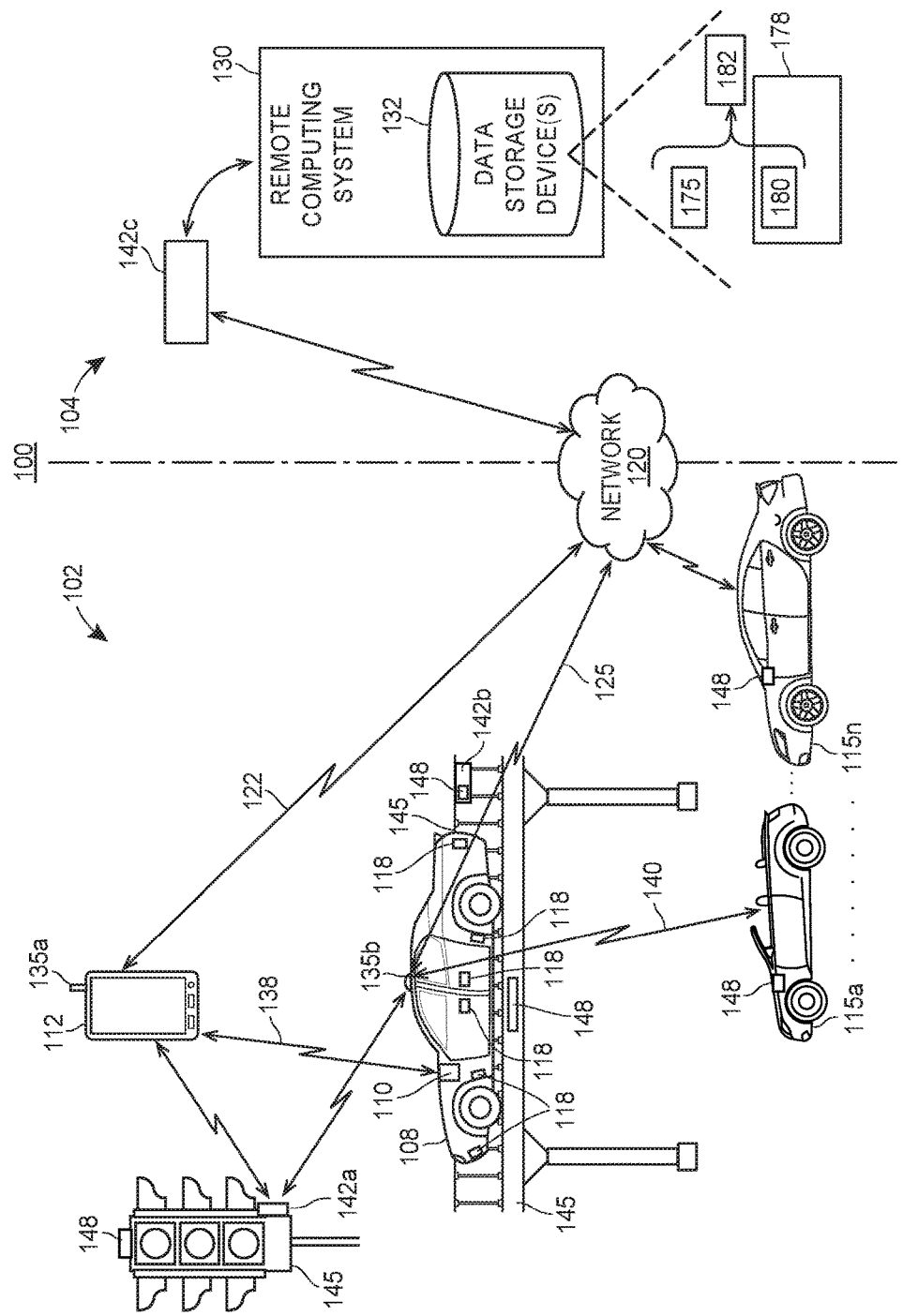

Turning to FIG. 1B, a high-level block diagram of an exemplary system 100 for automatically controlling operation of an autonomous vehicle based upon autonomous vehicle operations data may include both hardware and software applications, as well as various data communications channels for communicating data between the various hardware and software components, as is described in detail herein. The system 100 may be roughly divided into front-end components 102 and back-end components 104. The front-end components 102 may obtain information regarding an autonomous vehicle 108 (e.g., an autonomous car, an autonomous truck, an autonomous motorcycle, etc.) that is being automatically operated and regarding a context and surrounding environment (e.g., other autonomous vehicles, other vehicles, obstacles, etc.) in which the autonomous vehicle 108 is being automatically operated. One or more on-board computers 110 and/or one or more mobile devices 112 that are included in the front-end components 102 and disposed at the autonomous vehicle 108 may utilize this information to, for example, notify or alert the driver of the autonomous vehicle 108, notify or alert other drivers and other vehicles 115a-115n that are operating in the surrounding environment, automatically change an operating behavior of the autonomous vehicle 108 and/or of any one or more of the other vehicles 115a-115n. The one or more on-board computers 110 may be permanently or removably installed in the autonomous vehicle 108, and the one or more mobile devices 112 may be disposed at and transported by the autonomous vehicle 108, for example.

Generally speaking, the on-board computer 110 may be an on-board computing device capable of performing various functions relating to autonomous vehicle automatic operation. That is, the on-board computer 110 may be particularly configured with particular elements to thereby be able to perform functions relating to autonomous vehicle automatic operations. Further, the on-board computer 110 may be installed by the manufacturer of the autonomous vehicle 108, or as an aftermarket modification or addition to the autonomous vehicle 108. In FIG. 1B, although only one on-board computer 110 is depicted, it should be understood that in some embodiments, a plurality of on-board computers 110 (which may be installed at one or more locations within the autonomous vehicle 108) may be used. However, for ease of reading and not for limitation purposes, the on-board computing device or computer 110 is referred to herein using the singular tense.

The mobile device 112 may be transported by the autonomous vehicle 108 and may be, for example, a personal computer or personal electronic device (PED), cellular phone, smart phone, tablet computer, smart watch, wearable electronics, or a dedicated vehicle monitoring or control device which may be releasably attached to the autonomous vehicle 108. Although only one mobile device 112 is illustrated in FIG. 1B, it should be understood that in some embodiments, a plurality of mobile devices 112 may be included in the system 100. For ease of reading and not for limitation purposes, though, the mobile device 112 is referred to herein using the singular tense.

Further, it is noted that, in some embodiments, the on-board computer 110 may operate in conjunction with the mobile device 112 to perform any or all of the functions described herein as being performed on-board the autonomous vehicle 108. In other embodiments, the on-board computer 110 may perform all of the on-board vehicle functions described herein, in which case either no mobile device 112 is being transported by the autonomous vehicle 108, or any mobile device 112 that is being transported by the autonomous vehicle 108 is ignorant or unaware of vehicle and driver operations. In still other embodiments, the mobile device 112 may perform all of the onboard autonomous vehicle functions described herein. Still further, in some embodiments, the on-board computer 110 and/or the mobile device 112 may perform any or all of the functions described herein in conjunction with one or more back-end components 104. For example, in some embodiments or under certain conditions, the mobile device 112 and/or on-board computer 110 may function as thin-client devices that outsource some or most of the processing to one or more of the back-end components 104.

At any rate, the on-board computing device 110 and/or the mobile device 112 disposed at the autonomous vehicle 108 may communicatively interface with one or more on-board sensors 118 that are disposed on or within the autonomous vehicle 108 and that may be utilized to monitor the autonomous vehicle 108 and the environment in which the autonomous vehicle 108 is operating. That is, the one or more on-board sensors 118 may sense conditions associated with the autonomous vehicle 108 and/or associated with the environment in which the autonomous vehicle 108 is operating, and may collect data indicative of the sensed conditions. In some configurations, at least some of the on-board sensors 118 may be fixedly disposed at various locations on the autonomous vehicle 108. Additionally or alternatively, at least some of the on-board sensors may be incorporated within or connected to the on-board computer 110. Still additionally or alternatively, in some configurations, at least some of the on-board sensors 118 may be included on or within the mobile device 112. Whether disposed at or on the autonomous vehicle 108 or disposed at or on a mobile device 112 being transported by the autonomous vehicle 108, though, the one or more of the sensors 118 are generally referred to herein as "on-board sensors 118," and the data collected by the on-board sensors 118 is generally referred to herein as "sensor data," "on-board sensor data," or "vehicle sensor data." The on-board sensors 118 may communicate respective sensor data to the on-board computer 110 and/or to the mobile device 112, and the sensor data may be processed using the on-board computer 110 and/or the mobile device 112 to determine when the autonomous vehicle 108 is in operation as well as determine information regarding the autonomous vehicle 108 and/or the vehicle's operating behavior. In some situations, the on-board sensors 118 may communicate respective sensor data indicative of the environment in which the autonomous vehicle 108 is operating.

As discussed above, at least some of the on-board sensors 118 associated with the autonomous vehicle 108 may be removably or fixedly disposed within or at the autonomous vehicle 108, and further may be disposed in various arrangements and at various locations to sense and provide information. The sensors 118 that are installed at the autonomous vehicle 108 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 118 (e.g., GPS, accelerometer, or tachometer units) may provide sensor data indicative of, for example, the autonomous vehicle's location, speed, position acceleration, direction, responsiveness to controls, movement, etc. Other sensors 118 that are disposed at the autonomous vehicle 108 may be directed to the interior or passenger compartment of the autonomous vehicle 108, such as cameras, microphones, pressure sensors, weight sensors, thermometers, or similar sensors to monitor any passengers, operations of instruments included in the autonomous vehicle, operational behaviors of the autonomous vehicle, and/or conditions within the autonomous vehicle 108. For example, on-board sensors 118 directed to the interior of the autonomous vehicle 108 may provide sensor data indicative of, for example, in-cabin temperatures, in-cabin noise levels, data from seat sensors (e.g., indicative of whether or not a person is using a seat, and thus the number of passengers being transported by the autonomous vehicle 108), data from seat belt sensors, data regarding the operations of user controlled devices such as windshield wipers, defrosters, traction control, mirror adjustment, interactions with on-board user interfaces, etc. Some of the sensors 118 disposed at the autonomous vehicle 108 (e.g., radar, LIDAR, camera, or other types of units that operate by using electromagnetic energy) may actively or passively scan the environment external to the autonomous vehicle 108 for obstacles (e.g., other autonomous vehicles, other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment. Information or data that is generated or received by the on-board sensors 118 may be communicated to the on-board computer 110 and/or to the mobile device 112, for example.

In some embodiments of the system 100, the front-end components 102 may communicate collected sensor data to the back-end components 104 (e.g., via a network 120). For example, at least one of the on-board computer 110 or the mobile device 112 may communicate with the back-end components 104 via the network 120 to allow the back-end components 104 to record collected sensor data and information regarding autonomous vehicle usage. The network 120 may include a proprietary network, a secure public Internet, a virtual private network, and/or some other type of network, such as dedicated access lines, plain ordinary telephone lines, satellite links, cellular data networks, combinations of these and/or other types of networks. The network 120 may utilize one or more radio frequency communication links to communicatively connect to the autonomous vehicle 108, e.g., utilize wireless communication links 122 and 125 to communicatively connect with mobile device 112 and on-board computer 110, respectively. Where the network 120 comprises the Internet or other data packet network, data communications may take place over the network 120 via an Internet or other suitable data packet communication protocol. In some arrangements, the network 120 additionally or alternatively includes one or more wired communication links or networks.

The back-end components 104 include one or more servers or computing devices, which may be implemented as a server bank or cloud computing system 130, and is interchangeably referred to herein as a "remote computing system 130." The remote computing system 130 may include one or more computer processors adapted and configured to execute various software applications and components of the system 100, in addition to other software applications. The remote computing system 130 may further include or be communicatively connected to one or more data storage devices or entities 132, which may be adapted to store data related to the operation of the autonomous vehicle 108, the environment and context in which the autonomous vehicle 108 is operating, and/or other information. For example, the one or more data storage devices 132 may be implemented as a data bank or a cloud data storage system, at least a portion of which may be locally accessed by the remote computing system 130 using a local access mechanism such as a function call or database access mechanism, and/or at least a portion of which may be remotely accessed by the remote computing system 130 using a remote access mechanism such as a communication protocol. At any rate, the remote computing system 130 may access data stored in the one or more data storage devices 132 when executing various functions and tasks associated with the present disclosure.

To communicate with the remote computing system 130 and other portions of the back-end components 104, the front-end components 102 may include one or more communication components 135a, 135b that are configured to transmit information to and receive information from the back-end components 104 and, in some embodiments, transmit information to and receive information from other external sources, such as other autonomous vehicles, other vehicles and/or infrastructure or environmental components disposed within the autonomous vehicle's environment. The one or more communication components 135a, 135b may include one or more wireless transmitters or transceivers operating at any desired or suitable frequency or frequencies. Different wireless transmitters or transceivers may operate at different frequencies and/or by using different protocols, if desired. In an example, the mobile device 112 may include a respective communication component 135a for sending or receiving information to and from the remote computing system 130 via the network 120, such as over one or more radio frequency links or wireless communication channels 122 which support a first communication protocol (e.g., GSM, CDMA, LTE, one or more IEEE 802.11 Standards such as Wi-Fi, WiMAX, BLUETOOTH, etc.). Additionally or alternatively, the on-board computer 110 may operate in conjunction with an on-board transceiver or transmitter 135b that is disposed at the autonomous vehicle 108 (which may, for example, be fixedly attached to the autonomous vehicle 108) for sending or receiving information to and from the remote computing system 130 via the network 120, such as over one or more radio frequency links or wireless communication channels 125 which support the first communication protocol and/or a second communication protocol. In some embodiments, the on-board computer 110 may operate in conjunction with the mobile device 112 to utilize the communication component 135a of the mobile device 112 and the link 122 to deliver information to the back-end components 104. In some embodiments, the on-board computer 110 may operate in conjunction with the mobile device 112 to utilize the communication component 135b of the autonomous vehicle 108 and the link 125 to deliver information to the back-end components 104. In some embodiments, both communication components 135a, 135b and their respective links 122, 125 may be utilized by the on-board computer 110 and/or the mobile device 112 to communicate with the back-end components 104.

Accordingly, either one or both of the mobile device 112 or on-board computer 110 may communicate with the network 120 over the links 122 and/or 125. Additionally, in some configurations, the mobile device 112 and on-board computer 110 may communicate with one another directly over a link 138, which may be a wireless or wired link.

In some embodiments of the system 100, the on-board computer 110 and/or the on-board mobile device 112 of the autonomous vehicle 108 may communicate with respective on-board computers and/or mobile devices disposed at one or more other vehicles 115a-115n (e.g., emergency vehicles, other autonomous vehicles, or other vehicles), either directly or via the network 120. For example, the on-board computer 110 and/or the mobile device 112 disposed at the autonomous vehicle 108 may communicate with other vehicles' respective on-board computers and/or mobile devices via the network 120 and one or more of the communication components 135a, 135b by using one or more suitable wireless communication protocols (e.g., GSM, CDMA, LTE, one or more IEEE 802.11 Standards such as Wi-Fi, WiMAX, BLUETOOTH, etc.). In some configurations, the on-board computer 110 may communicate with a particular vehicle 115a-115n directly in a peer-to-peer (P2P) manner via one or more of the communication components 135a, 135b and the direct wireless communication link 140, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more roadway infrastructure communication components, devices, or sensors, examples of which are depicted in FIG. 1B by references 142a, 142b, 142c, that are used for monitoring the status of one or more infrastructure components 145 and/or for receiving data generated by other sensors 148 that are associated with the autonomous vehicle 108 and disposed at locations that are off-board the autonomous vehicle 108. As generally referred to herein, with respect to the autonomous vehicle 108, "off-board sensors" or "roadway infrastructure sensors" 148 are sensors that are not being transported by the autonomous vehicle 108. The data collected by the off-board sensors 148 is generally referred to herein as "sensor data," "off-board sensor data," or "roadway infrastructure data" with respect to the autonomous vehicle 108.

At least some of the off-board sensors 148 may be disposed on or at the one or more infrastructure components 145 or other types of components that are fixedly disposed within the environment in which the autonomous vehicle 108 is traveling. Infrastructure components 145 may include roadways, bridges, traffic signals, gates, switches, crossings, parking lots or garages, toll booths, docks, hangars, or other similar physical portions of a transportation system's infrastructure, for example. Other types of infrastructure components 145 at which off-board sensors 148 may be disposed may include a traffic light, a street sign, a railroad crossing signal, a construction notification sign, a roadside display configured to display messages, a billboard display, a parking garage monitoring device, etc. Off-board sensors 148 that are disposed on or near infrastructure components 145 may generate roadway infrastructure data relating to the presence and location of obstacles or of the infrastructure component 145 itself, weather conditions, traffic conditions, operating status of the infrastructure component 145, and/or behaviors of various vehicles 108, 115a-115n, pedestrians, and/or other moving objects within the vicinity of the infrastructure component 145, for example.

Additionally or alternatively, at least some of the off-board sensors 148 that are communicatively connected to the one or more infrastructure devices 145 may be disposed on or at one or more other vehicles 115a-115n operating in the vicinity of the autonomous vehicle 108. As such, a particular sensor that is disposed on-board another vehicle 115a may be viewed as an off-board sensor 148 with respect to the autonomous vehicle 108.

At any rate, the one or more environmental communication devices 142a-142c that are associated with the autonomous vehicle 108 may be communicatively connected (either directly or indirectly) to one or more off-board sensors 148, and thereby may receive information relating to the condition and/or location of the infrastructure components 145, of the environment surrounding the infrastructure components 145, and/or of other vehicles 115a-115n or objects within the environment of the autonomous vehicle 108. In some embodiments, the one or more roadway infrastructure devices 142a-142c may receive information from the autonomous vehicle 108, while, in other embodiments, the roadway infrastructure device(s) 142a-142c may only transmit information to the autonomous vehicle 108. As previously discussed, at least some of the environmental communication devices may be locally disposed in the environment in which the autonomous vehicle 108 is operating, e.g., as denoted by references 142a, 142b. In some embodiments, at least some of the roadway infrastructure devices may be remotely disposed, e.g., at the back-end 104 of the system 100 as denoted by reference 142c. In some embodiments, at least a portion of the roadway infrastructure devices may be included in (e.g., integral with) one or more off-board sensors 148, e.g., as denoted by reference 142b. In some configurations, at least some of the environmental communication devices 142 may be included or integrated into the one or more on-board communication components 135a, 135b, the on-board computer 110, and/or the mobile device 112 of surrounding vehicles 115a-115n (not shown).

In addition to receiving information from the on-board sensors 118 and off-board sensors 148 associated with the autonomous vehicle 108, the on-board computer 110 at the autonomous vehicle 108 may directly or indirectly control the operation of the autonomous vehicle 108 according to various fully- or semi-autonomous operation features. The autonomous operation features may include software applications or modules implemented by the on-board computer 110 to generate and implement control commands to control the steering, braking, or motive power of the autonomous vehicle 108. To facilitate such control, the on-board computer 110 may be communicatively connected to control components of the autonomous vehicle 108 by various electrical or electromechanical control components (not shown). When a control command is generated by the on-board computer 110, it may thus be communicated to the control components of the autonomous vehicle 108 to effect a control action. In embodiments involving fully autonomous vehicles, the autonomous vehicle 108 may be operable only through such control components (not shown). In other embodiments, the control components may be disposed within or supplement other vehicle operator control components (not shown), such as steering wheels, accelerator or brake pedals, or ignition switches.

Further, the on-board computer 110 may control one or more operations of the autonomous vehicle 108 when the vehicle is operating non-autonomously. For example, the on-board computer 110 may automatically detect respective triggering conditions and automatically activate corresponding features such as traction control, windshield wipers, headlights, braking, etc.

Exemplary Vehicle for Use within a Traffic Density Management System

Figure 2:
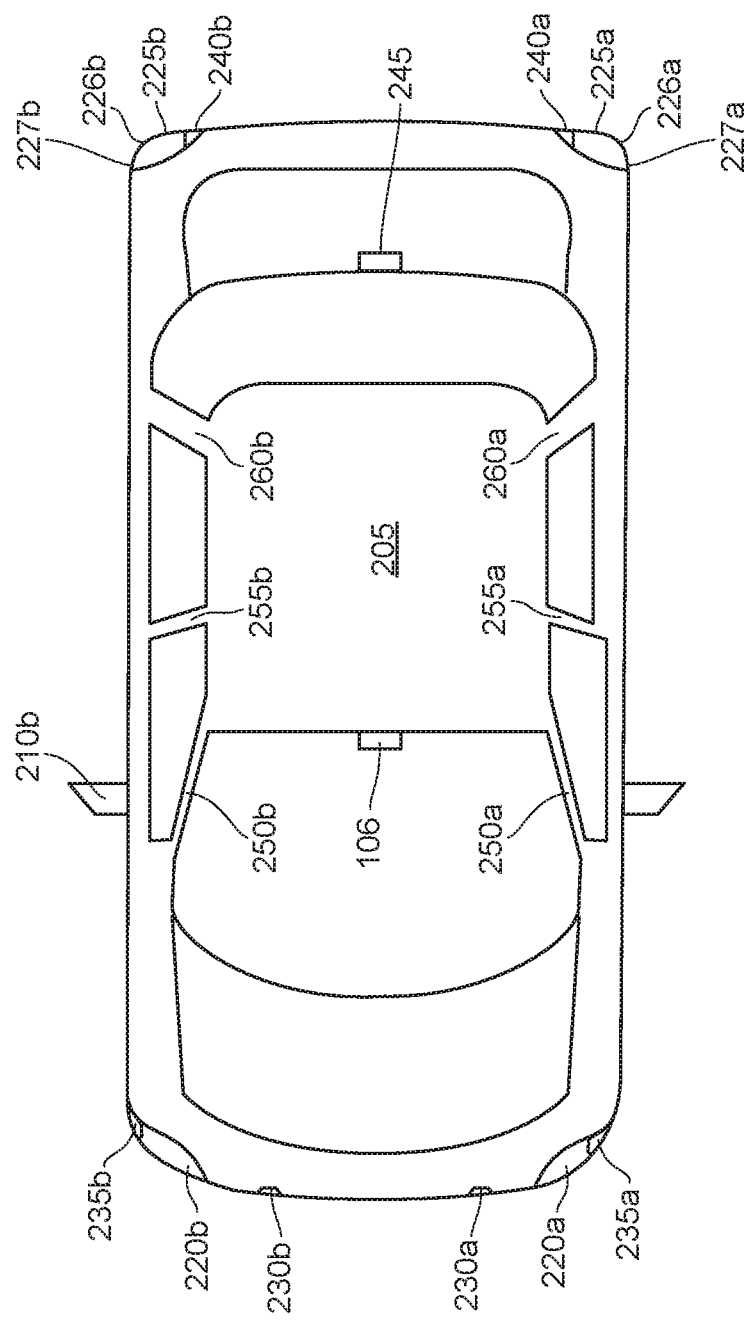
FIG. 2 depicts an example autonomous vehicle.

With reference to FIG. 2, a plan view of an autonomous vehicle 205 is depicted. The autonomous vehicle 205 may be similar to, for example, the autonomous vehicle 105a of FIG. 1A. The autonomous vehicle 205 may include an interior rearview mirror/sensor(s) (e.g., interior rearview mirror/sensor(s) 106a of FIG. 1A), a driver side front headlight 220a, a driver side front turn signal 235a, a driver side front marker light 230a, a passenger side front headlight 220b, a passenger side front turn signal 235b and/or a passenger side front marker light 230b. The interior rearview mirror/sensor(s) 106a may include, for example, a global positioning sensor associated with a global positioning system (GPS). The GPS may generate, for example, data representative of a geographic location of the autonomous vehicle 205 based upon, for example, an output of an associated global positioning sensor.

The autonomous vehicle 205 may also include rearward sensor(s) within, for example, a center high-mounted stop light (CHMSL) 245, a driver side rear taillight 225a, a driver side rear turn signal 226a, a driver side rear marker light 227a, a driver side rear backup light 240a, a passenger side rear taillight 225b, a passenger side rear turn signal 226b, a passenger side rear marker light 227b and/or a passenger side rear backup light 240b. The autonomous vehicle 205 may further include driver side sensor(s) in a driver side exterior rearview mirror 210a, a driver side A-pillar 250a, a driver side B-pillar 255a and/or a driver side C-pillar 260a. The autonomous vehicle 205 may further include passenger side sensor(s) within, for example, a passenger side exterior rearview mirror 210b, a passenger side A-pillar 250b, a passenger side B-pillar 255b and/or a passenger side C-pillar 260b. Any given autonomous vehicle 205 may include additional, and/or alternate, sensor(s) in locations other than those specifically described with regard to FIG. 2 (e.g., within an instrument cluster, within an on-board computing device, within an on-board diagnostic device, etc.). Any one of the sensors that are illustrated in FIG. 2, or that are located elsewhere within the autonomous vehicle 205, may be an image sensor (e.g., a camera), an ultra-sonic sensor, an infrared sensor, an audio sensor (e.g., microphone), a pressure sensor, an autonomous vehicle autonomous mode sensor, an autonomous vehicle manual mode sensor, a vehicle speed sensor, a vehicle pitch sensor, a vehicle yaw sensors, a global positioning system sensor, an air bag activation sensor, a collision avoidance system sensor, or the like and may provide real-time autonomous vehicle operating data to an autonomous vehicle computer (not shown in FIG. 2). While not explicitly shown, a non-autonomous vehicle may include sensors similar to the sensors shown in FIG. 2 with respect to the autonomous vehicle 205.

Exemplary Computer System for Traffic Density Management

Figure 3:
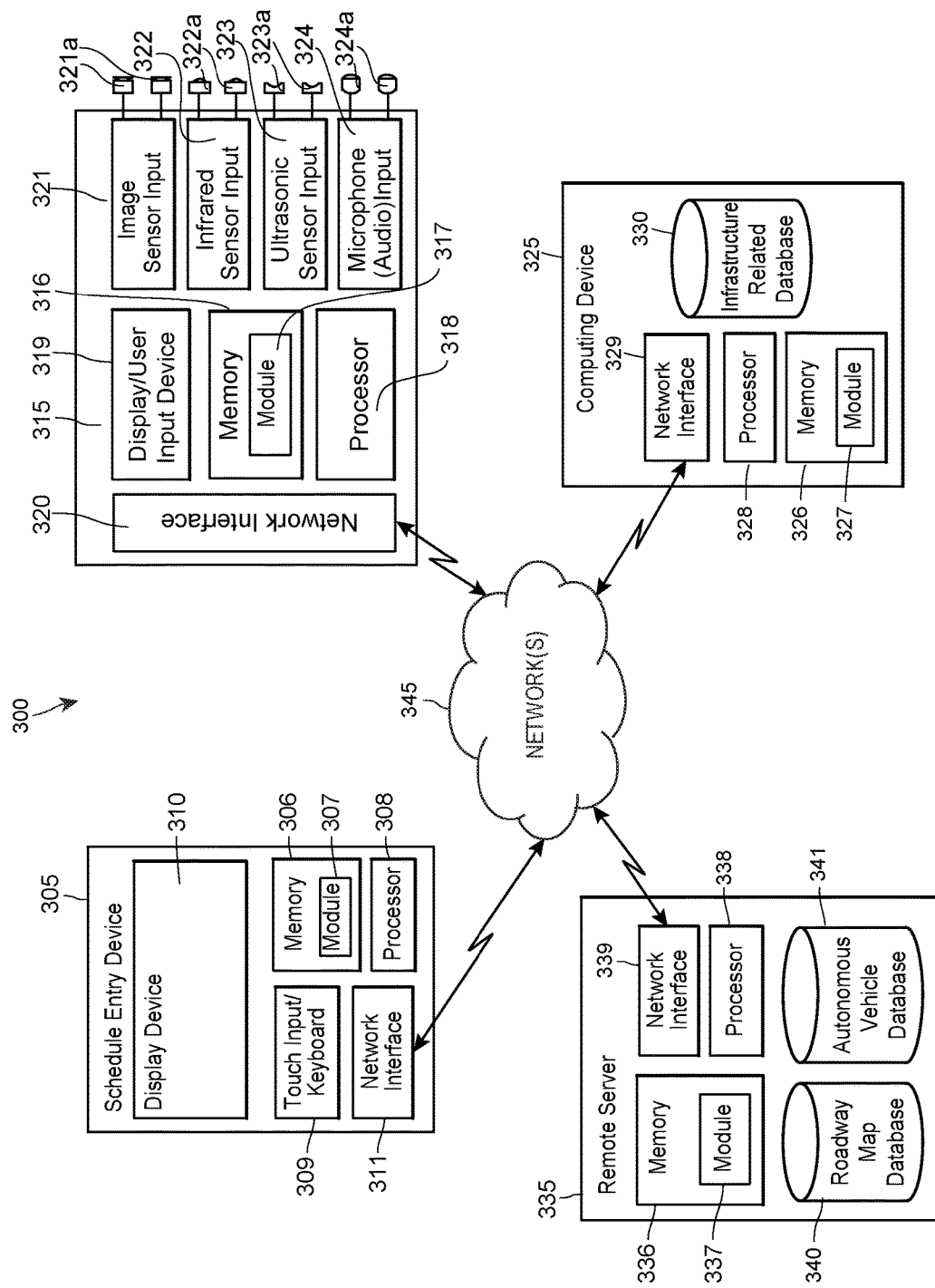
FIG. 3 depicts a high-level block diagram of an example computer system for vehicle roadway traffic density management.

Turning to FIG. 3, a high-level block diagram of an example computer system for vehicle roadway traffic density management 300 may implement communications between a schedule entry device 305, a vehicle device 315, a remote server 335, and/or a computing device 325 to communicate, for example, real-time vehicle operating data (e.g., data from any one of, or a combination of the sensors, of FIG. 2) via, for example, a communication network 345.

For clarity, only one schedule entry device 305, one vehicle device 315, one computing device 325, and one remote server 335 are depicted in FIG. 3. While FIG. 3 depicts only one schedule entry device 305, one vehicle device 315, one computing device 325, and one remote server 335, it should be understood that any number of schedule entry devices 305, vehicle devices 315, computing devices 325, and/or remote servers 335 may be supported.

The vehicle device 315 may include a memory 316 and a processor 318 for storing and executing, respectively, an optimal vehicle density module 317. The optimal vehicle density module 317, may be stored in the memory 316 as, for example, a set of computer-readable instructions, and may be related to an autonomous vehicle real-time operating data collecting and vehicle operation application that, when executed on the processor 318, may cause the processor 318 to store real-time autonomous vehicle operation data in the memory 316. Execution of the optimal vehicle density module 317 may also cause the processor 318 to transmit real-time autonomous vehicle data to the remote server 335 and/or the computing device 325. Execution of the optimal vehicle density module 317 may further cause the processor 318 to associate the real-time autonomous vehicle data with a time and, or a date.

Execution of the module 317 may further cause the processor 318 to communicate with a processor 338 of the remote server 335 via a network interface 339, a vehicle device communications network connection 320 and a communication network 345. Execution of the module 317 may also cause the processor 318 to communicate with a processor 308 of the schedule entry device 305 via a network interface 311, a vehicle device communications network connection 320 and a communication network 345. Execution of the module 317 may further cause the processor 318 to communicate with a processor 328 of the computing device 325 via a network interface 329, a vehicle device communications network connection 320 and a communication network 345.

The vehicle device 315 may further include an image sensor input 321 communicatively connected to a first image sensor and a second image sensor 321a. While two image sensors 321a are depicted in FIG. 3, any number of image sensors 321a may be included within a vehicle system and may be located within a vehicle as described, for example, with regard to FIGS. 1 and 2. The vehicle device 315 may also include an infrared sensor input 322 communicatively connected to a first infrared sensor and a second infrared sensor 322a. While two infrared sensors 322a are depicted in FIG. 3, any number of infrared sensors 322a may be included within a vehicle system and may be located within a vehicle as described, for example, with regard to FIGS. 1 and 2. The vehicle device 315 may further include an ultrasonic sensor input 323 communicatively connected to a first ultrasonic sensor and a second ultrasonic sensor 323a. While two ultrasonic sensors 323a are depicted in FIG. 3, any number of ultrasonic sensors 232a may be included within a vehicle system and may be located within a vehicle as described, for example, with regard to FIGS. 1 and 2. The vehicle device 315 may also include a microphone input 324 communicatively connected to a first microphone and a second microphone 324a. While two microphones 324a are depicted in FIG. 3, any number of microphones 324a may be included within a vehicle system and may be located within a vehicle as described, for example, with regard to FIGS. 1 and 2. The vehicle device 315 may further include a display/user input device 319 configured with, for example, a user interface that may enable a vehicle passenger to enter scheduling information (e.g., a geographic destination, a time constraint, etc.).

The network interface 320 may be configured to facilitate communications between the vehicle device 315, the schedule entry device 305, the remote server 335 and/or the computing device 325 via any hardwired or wireless communication network 345, including for example a wireless LAN, MAN or WAN, WiFi, the Internet, a Bluetooth connection, or any combination thereof. Moreover, the vehicle device 315 may be communicatively connected to the scheduling device 305, the remote server 335 and/or the computing device 325 via any suitable communication system, such as via any publicly available or privately owned communication network, including those that use wireless communication structures, such as wireless communication networks, including for example, wireless LANs and WANs, satellite and cellular telephone communication systems, etc. The vehicle device 315 may, for example, cause real-time vehicle operation data to be stored in a computing device 325 memory 326, a roadway infrastructure related database 330, a schedule entry device 305 memory 306, a remote server 335 memory 336, an autonomous vehicle database 341 and/or a roadway map database 340.

The computing device 325 may include a memory 326 and a processor 328 for storing and executing, respectively, a traffic density management module 327. The traffic density management module 327, may be stored in the memory 326 as a set of computer-readable instructions, that may facilitate applications related to collecting autonomous vehicle scheduling data and/or autonomous vehicle real-time operating data, and may generate autonomous vehicle operation data. The traffic density management module 327 may also facilitate communications between the computing device 325, the remote server 335, the schedule entry device 305 and/or the vehicle device 315 via a network interface 329 and the network 345, and other functions and instructions. The network interface 329 may be similar to, for example, the network interface 320.

The remote server 335 may include a memory 336 and a processor 338 to store and execute, respectively, a traffic density management module 337. The remote server 335 may be communicatively coupled to an autonomous vehicle database 341 and/or a roadway geographic map database 340. While the autonomous vehicle database 341 and the roadway geographic map database 340 are shown in FIG. 3 as being communicatively coupled to the remote server 335, it should be understood that the autonomous vehicle database 341 and/or the roadway geographic map database 340 may be located within separate remote servers (or any other suitable computing devices) communicatively coupled to the remote server 335. Optionally, portions of the autonomous vehicle database 341 and/or the roadway geographic map database 340 may be associated with memory modules that are separate from one another, such as a memory 326 of the computing device 325.

The schedule entry device 305 may include a touch input/keyboard 309, a display device 310, a memory 306 and a processor 308 to store and execute, respectively, a traffic density management module 307 for entering scheduling data related to autonomous vehicles. The processor 308, further executing the traffic density management module 307, may transmit data to, and/or receive data from, the vehicle device 315, the computing device 325 and/or the remote server 335.

Figure 4:
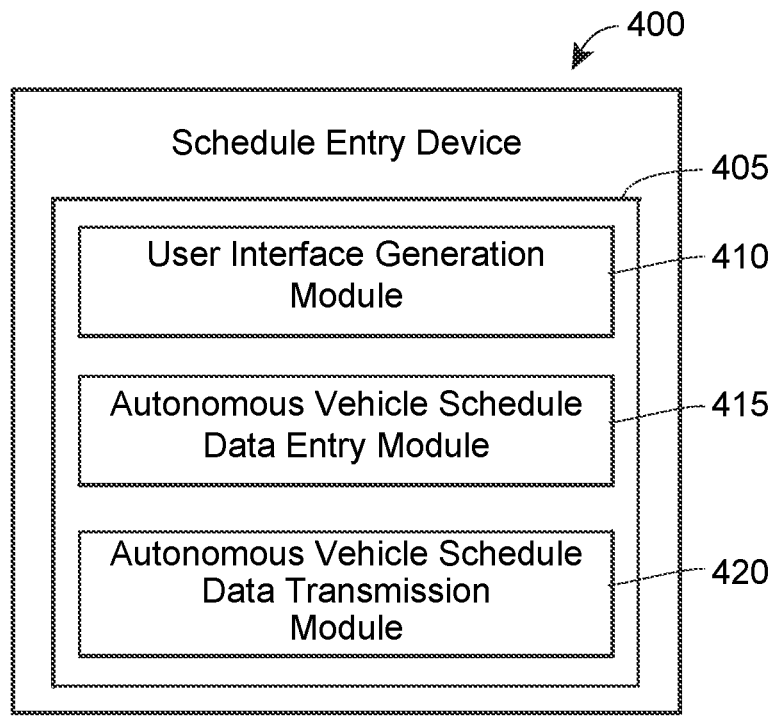
FIG. 4 depicts a block diagram of an example schedule entry device for use within the vehicle roadway traffic density management system of FIG. 3.

Exemplary Schedule Entry Device for Use within a Traffic Density Management System With reference to FIG. 4, a schedule entry device 400 may include a user interface generation module 410, an autonomous vehicle schedule data receiving module 415, and an autonomous vehicle schedule data transmission module 420 stored on, for example, a memory 405 as a computer-readable set of instructions. The schedule entry device 400 may be similar to the schedule entry device 305 of FIG. 3, and/or may include additional, less, or alternate functionality, including that discussed elsewhere herein. The modules 410-420 may be similar to, for example, the module 307 of FIG. 3. In any event, as described in more detail elsewhere herein, an autonomous vehicle passenger may enter, for example, a current geographic location, a desired destination, whether the passenger is willing to accept a route that is other than a route associated with a least time to the destination, a time constraint, etc. via the schedule entry device 400.

Figure 5:
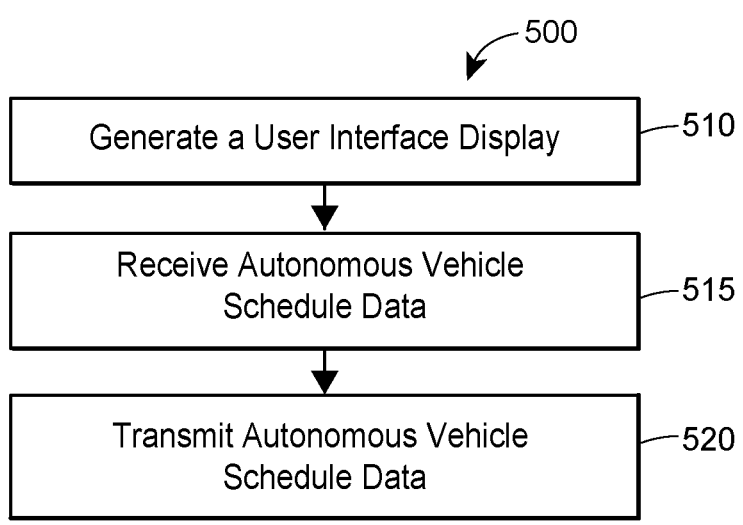
FIG. 5 depicts a flow diagram of an example method of operating the schedule entry device of FIG. 4.

Exemplary Method for Operating a Schedule Entry Device for Use within a Traffic Density Management System Turning to FIG. 5, a method of operating a schedule entry device 500 may be implemented by a processor (e.g., processor 308 of schedule entry device 305 of FIG. 3) executing, for example, module 307 of FIG. 3 and/or modules 410-420 of FIG. 4. In particular, processor 308 may execute the user interface generation module 410 to cause the processor 308 to, for example, generate a user interface (block 510). The processor 308 may, for example, cause the user interface to be displayed on a display device (e.g., display 310 of FIG. 3). A user (e.g., an autonomous vehicle passenger) may enter autonomous vehicle schedule data (e.g., a current geographic location, a desired destination, whether the passenger is willing to accept a route that is other than a route associated with a least time to the destination, a time constraint, credit card information, etc.) via the user interface. The processor 308 may execute the autonomous vehicle schedule data entry module 415 to cause the processor 308 to, for example, receive the autonomous vehicle schedule data (block 515). The processor 308 may execute the autonomous vehicle schedule data transmission module 420 to cause the processor 308 to, for example, transmit autonomous vehicle schedule data to a vehicle device 315, 600, a computing device 325, 800 and/or a remote server 335, 1000 (block 520). The method 500 may include additional, fewer, or alternate actions, including those discussed elsewhere herein.

Exemplary Vehicle Device for Use within a Traffic Density Management System

Figure 6:
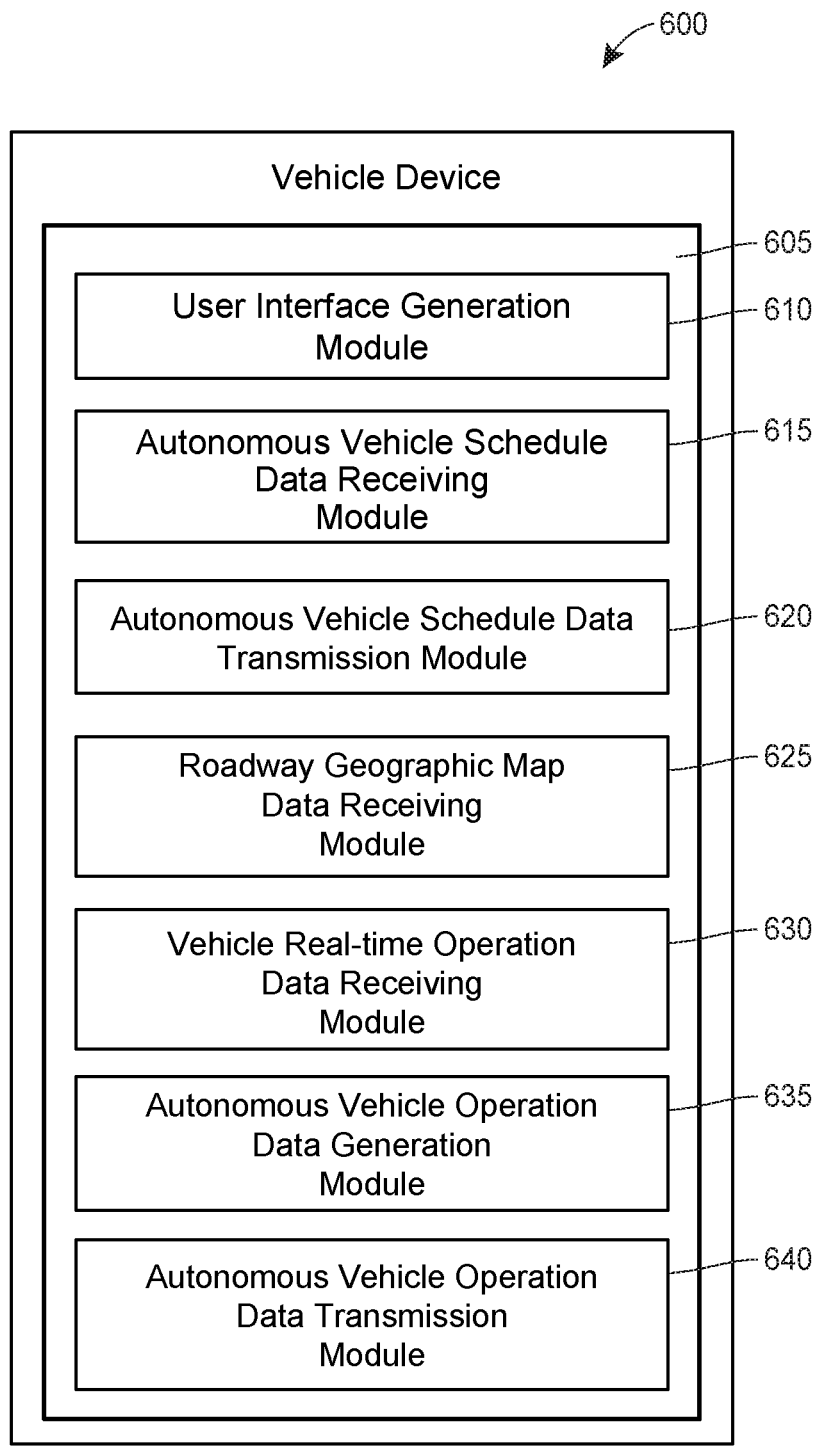
FIG. 6 depicts a block diagram of an example vehicle device for use within the vehicle roadway traffic density management system of FIG. 3.

With reference to FIG. 6, a vehicle device 600 may include a user interface generation module 610, an autonomous vehicle schedule data receiving module 615, an autonomous vehicle schedule data transmission module 620, a roadway geographic map data receiving module 625, a vehicle real-time operation data receiving module 630, an autonomous vehicle operation data generation module 635, and an autonomous vehicle operation data transmission module 640 stored on, for example, a memory 605 as a computer-readable set on instructions. The vehicle device 600 may be similar to the vehicle device 315 of FIG. 3, and/or may include additional, less, or alternate functionality, including that discussed elsewhere herein. The modules 610-640 may be similar to, for example, the module 317 of FIG. 3. In any event, as described in more detail elsewhere herein, an autonomous vehicle passenger may enter, for example, a current geographic location, a desired destination, whether the passenger is willing to accept a route that is other than a route associated with a least time to the destination, a time constraint, etc. via the vehicle device 600.

As described in detail elsewhere herein, the vehicle device 600 may determine autonomous vehicle operation data, and may automatically operate an associated autonomous vehicle based on the autonomous vehicle operation data.

Figure 7:
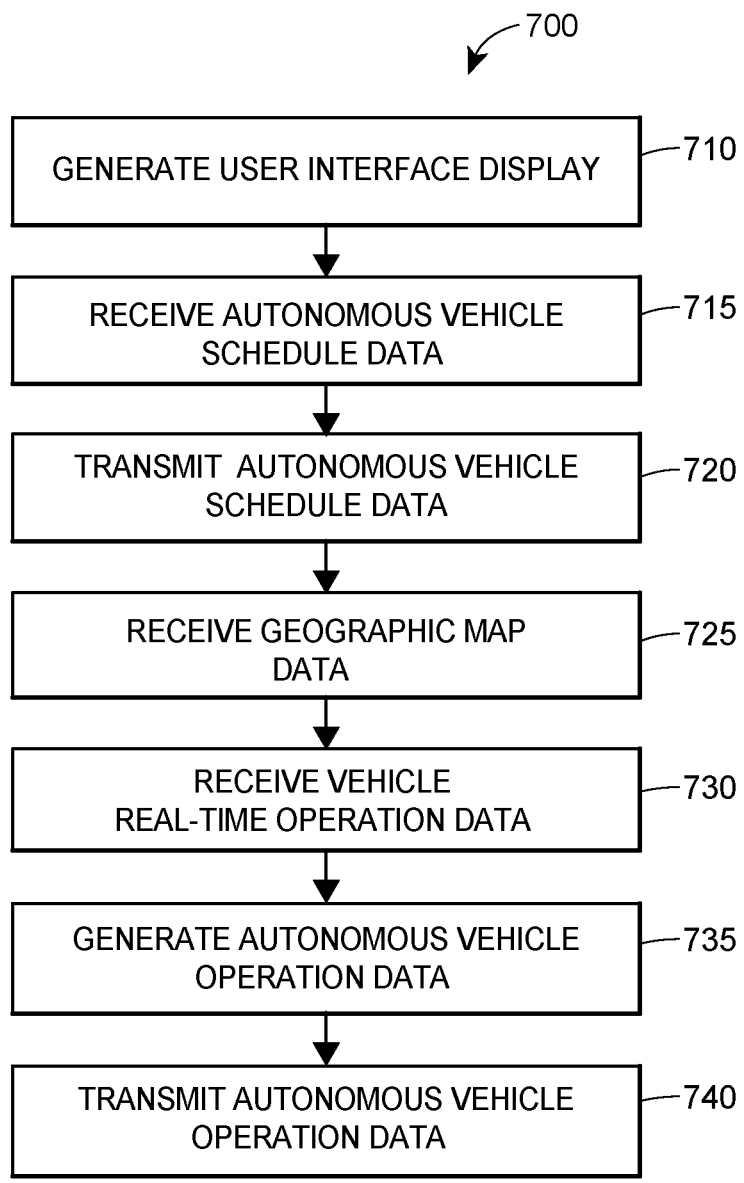
FIG. 7 depicts a flow diagram of an example method of operating the vehicle device of FIG. 6.

Exemplary Method of Operating a Vehicle Device for Use within a Traffic Density Management System Turning to FIG. 7, a method of operating a vehicle device 700 may be implemented by a processor (e.g., processor 318 of vehicle device 315 of FIG. 3) executing, for example, module 317 or modules 610-640 of FIG. 6. In particular, processor 318 may execute the user interface generation module 610 to cause the processor 318 to, for example, generate a user interface (block 710). The processor 318 may, for example, cause the user interface to be displayed on a display device (e.g., display 319 of FIG. 3). A user (e.g., an autonomous vehicle passenger) may enter autonomous vehicle schedule data (e.g., a current geographic location, a desired destination, whether the passenger is willing to accept a route that is other than a route associated with a least time to the destination, a time constraint, etc.) via the user interface. The processor 318 may execute the autonomous vehicle schedule data receiving module 615 to cause the processor 318 to, for example, receive the autonomous vehicle schedule data (block 715). The processor 318 may execute the autonomous vehicle schedule data transmission module 620 to cause the processor 318 to, for example, transmit autonomous vehicle schedule data to a schedule entry device 305, 400, a computing device 325, 800 and/or a remote server 335, 1000 (block 720).

Processor 318 may execute a roadway geographic map data receiving module 625 to cause the processor 318 to, for example, receive roadway geographic map data from, for example, a roadway map database (e.g., roadway map database 340 of FIG. 3) (block 725). The processor 318 may execute a vehicle real-time operation data receiving module 630 to cause the processor 318 to receive vehicle real-time operation data from, for example, any one of the sensors 321a, 322a, 323a, 324a and/or a GPS sensor (block 730). The vehicle real-time operation data may be representative of, for example, an associated vehicle speed, proximity of an associated vehicle to another vehicle/object, an associated vehicle geographic location, etc.

The processor 318 may execute an autonomous vehicle operation data generation module 635 to cause the processor 318 to, for example, generate autonomous vehicle operation data (block 735). The autonomous vehicle operation data may be based on the autonomous vehicle schedule data, the vehicle real-time operation data, roadway infrastructure data, autonomous vehicle roadway infrastructure data, and/or the roadway geographic map data. The autonomous vehicle operation data may be representative of a desired autonomous vehicle speed, a desired autonomous vehicle steering wheel angle, activation of an autonomous vehicle brake, activation of an autonomous vehicle throttle, a desired autonomous vehicle geographic location, etc.

The processor 318 may automatically operate an associated autonomous vehicle 105a based on the autonomous vehicle operation data. For example, when a given autonomous vehicle 105a is travelling in a right-hand lane of a two lane highway and another vehicle (e.g., either another autonomous vehicle or a non-autonomous vehicle) is about to enter the right-hand lane from an onramp, the processor 318 may automatically cause the autonomous vehicle 105a to move into a left-hand lane, or other lane, that includes a less-dense traffic volume compared to the right-hand lane. In this example, processors of other autonomous vehicles, within an associated vehicle roadway traffic density management system (e.g., vehicle roadway traffic density management system 300 of FIG. 3) may cause an associated autonomous vehicle to, for example, slow down, speed up, or change to another lane. Thereby, the vehicle roadway traffic density management system 300 may manage traffic density within an overall operating environment (e.g., operating environment of FIGS. 1A and 1B).

In another example, the processor 318 may automatically operate an associated autonomous vehicle 105a based upon autonomous vehicle passenger data. The autonomous vehicle passenger data may be representative of whether, or not, an associated passenger approves the autonomous vehicle taking, for example, a longer (less densely travelled) route. Should the passenger approve the longer time route, the processor 318 may automatically operate the autonomous vehicle 105a to travel on a route, between an origination location and a destination location, that takes more time compared to another route. In the converse, should the passenger not approve the longer time route, the processor 318 may automatically operate the autonomous vehicle 105a to travel on a shorter time route, between the origination location and the destination location, even though the autonomous vehicle 105a will cause more dense traffic on the shorter time route. In situations in which there are no human being in an autonomous vehicle 105a, and the autonomous vehicle 105a is operated in a driverless mode, the term "passenger" shall include, an owner, an operator, a customer, a remote user, etc. When an autonomous vehicle 105a is returning to some default "home" location, and is not travelling due to a specific request from a person, the processor 318 may automatically cause the autonomous vehicle 105a to take a longer route in order to minimize congestion.

In a further example, the processor 318 may automatically operate an associated autonomous vehicle 105a to speed up and/or slow down depending on proximity of the autonomous vehicle 105a to other vehicles (e.g., other autonomous vehicles or non-autonomous vehicles). More generally, the processor 318 may automatically operate an associated autonomous vehicle 105a based on the autonomous vehicle operation data.

The processor 318 may execute an autonomous vehicle operation data transmission module 640 to cause the processor 318 to, for example, transmit the autonomous vehicle operation data to a schedule entry device 305, 400, a computing device 325, 800 and/or a remote server 335, 1000 (block 740). The method 700 may include additional, fewer, or alternate actions, including those discussed elsewhere herein.

Exemplary Computing Device for Use within a Traffic Density Management System

Figure 8:
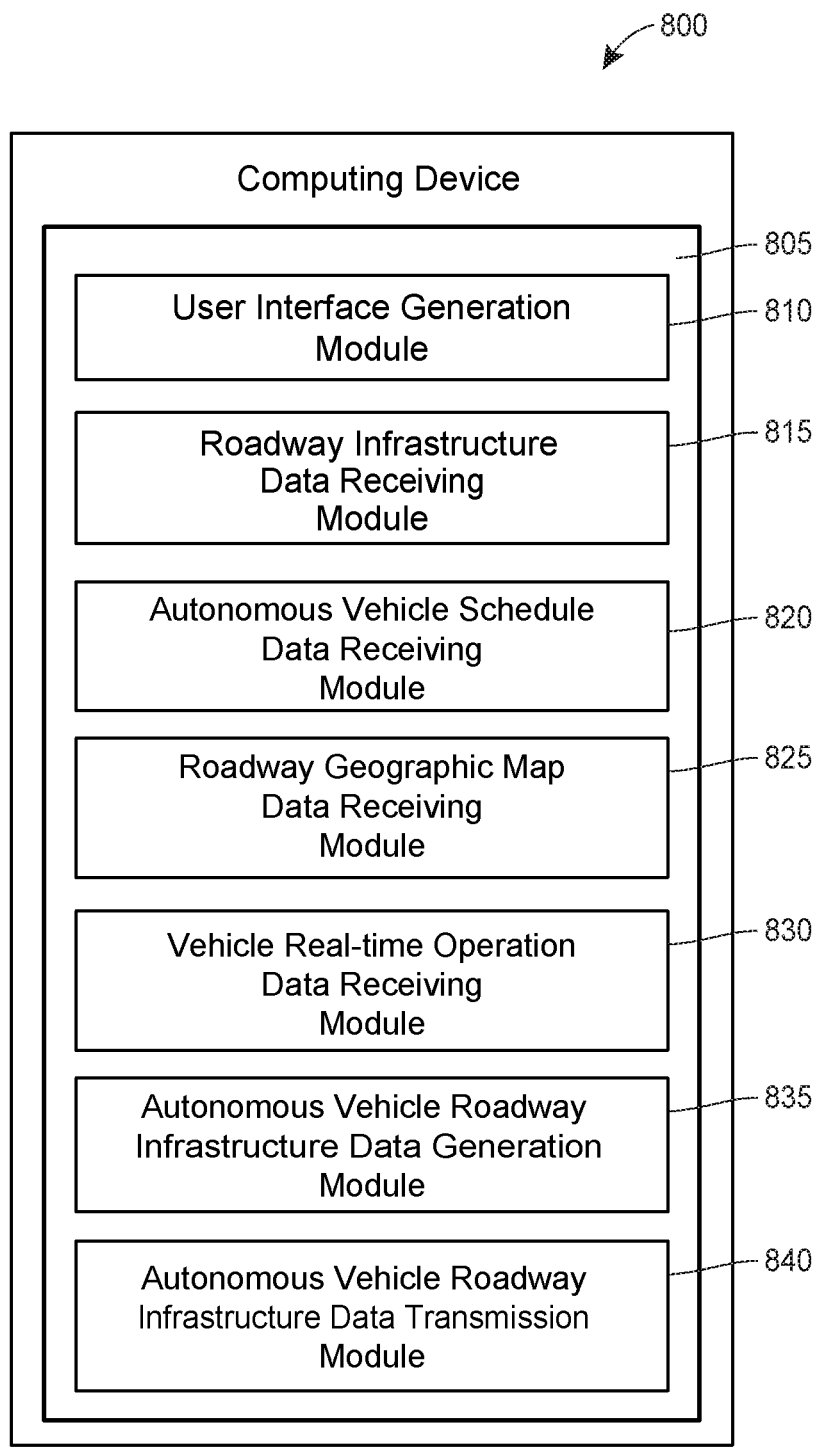
FIG. 8 depicts a block diagram of an example computing device for use within the vehicle roadway traffic density management system of FIG. 3.

With reference to FIG. 8, a computing device 800 may include a user interface generation module 810, roadway infrastructure data receiving module 815, an autonomous vehicle schedule data receiving module 820, a roadway geographic map data receiving module 825, a vehicle real-time operation data receiving module 830, an autonomous vehicle roadway infrastructure data generation module 835, and an autonomous vehicle roadway infrastructure data transmission module 840 stored on, for example, a memory 805. The computing device 800 may be similar to the computing device 325 of FIG. 3, and/or may include additional, less, or alternate functionality, including that discussed elsewhere herein. The modules 810-840 may be similar to, for example, the module 327 of FIG. 3. In any event, as described in more detail elsewhere herein, a vehicle roadway employee may enter roadway infrastructure related data via the computing device 800, the computing device 800 may receive roadway infrastructure data from a plurality of roadway sensors, and/or the computing device 800 may generate autonomous vehicle roadway infrastructure data. The roadway infrastructure data entered by a vehicle roadway employee may be representative of, for example, roadway construction, roadway detours, roadway accidents, weather related information, etc.

Figure 9:
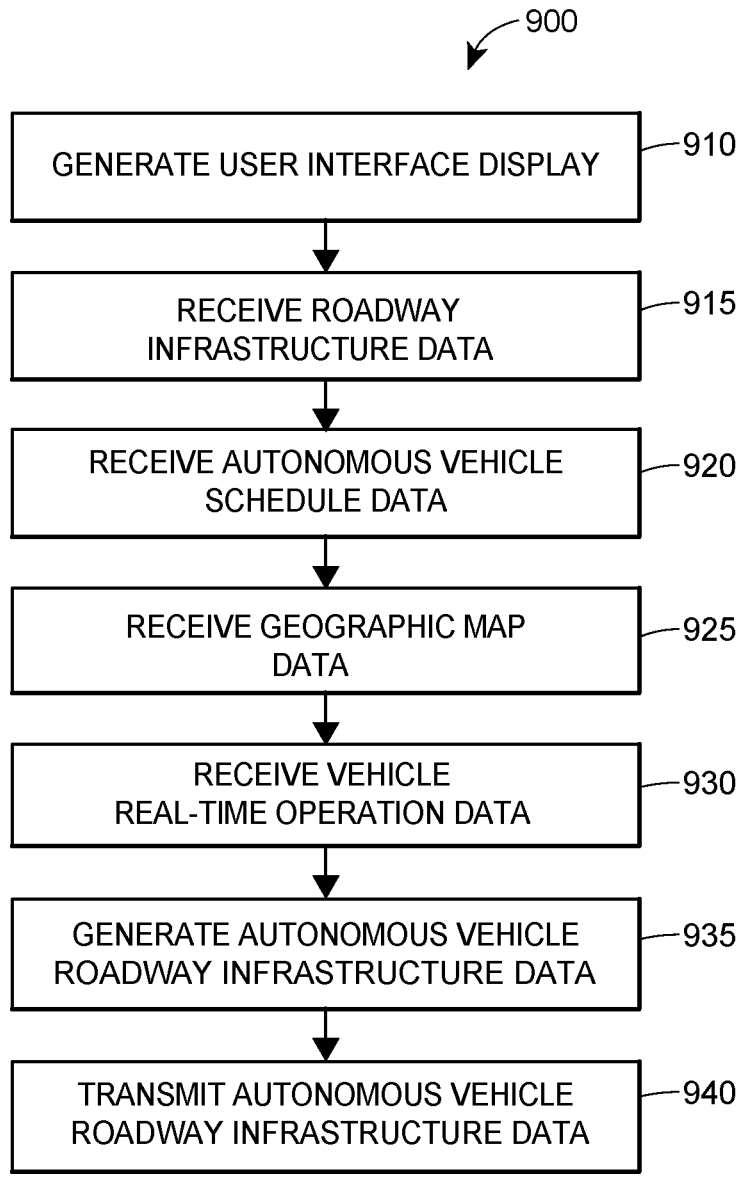
FIG. 9 depicts a flow diagram of an example method of operating the computing device of FIG. 8.

Exemplary Method of Operating a Computing Device for Use within a Traffic Density Management System Turning to FIG. 9, a method of operating a computing device 900 may be implemented by a processor (e.g., processor 328 of computing device 325 of FIG. 3) executing, for example, module 327 or modules 810-840 of FIG. 8. In particular, the processor 328 may execute the user interface generation module 810 to cause the processor 328 to, for example, generate a user interface (block 910). The processor 328 may, for example, cause the user interface to be displayed on a display device. The processor 328 may execute roadway infrastructure data receiving module 815 to cause the processor 328 to, for example, receive roadway infrastructure data from, for example, roadway infrastructure employee via the user interface and/or a plurality of roadway sensors (e.g., roadway sensors 142*a*, 142*b*, of FIG. 1B) (block 915). The roadway infrastructure data may be representative of, for example, an autonomous vehicle operating environment.

The processor 328 may execute an autonomous vehicle schedule data receiving module 820 to cause the processor 328 to, for example, receive autonomous vehicle schedule data from, for example, a schedule entry device 305, 400 and/or a vehicle device 315, 600 (block 920). The processor 328 may execute a roadway geographic map data receiving module 825 to cause the processor 328 to, for example, receive roadway geographic map data from, for example, a roadway map database (e.g., roadway map database 340 of FIG. 3) (block 925). The processor 328 may execute a vehicle real-time operation data receiving module 830 to cause the processor 328 to, for example, receive vehicle real-time operation data from, for example, a vehicle device 315, 600 (block 930).

The processor 328 may execute an autonomous vehicle roadway infrastructure data generation module 835 to cause the processor 328 to, for example, generate autonomous vehicle roadway infrastructure data (block 935). The autonomous vehicle roadway infrastructure data may be based on, for example, the roadway infrastructure data, the autonomous vehicle schedule data, the roadway geographic map data and/or the vehicle real-time operation data. The processor 328 may execute an autonomous vehicle roadway infrastructure data transmission module 840 to cause the processor 328 to, for example, transmit autonomous vehicle roadway infrastructure data to a schedule entry device 305, 400, a vehicle device 315, 600 and/or a remote server 335, 1000 (block 940). The method 900 may include additional, less, or alternate functionality, including that discussed elsewhere herein.

Exemplary Remote Server for Use within a Traffic Density Management System

Figure 10:
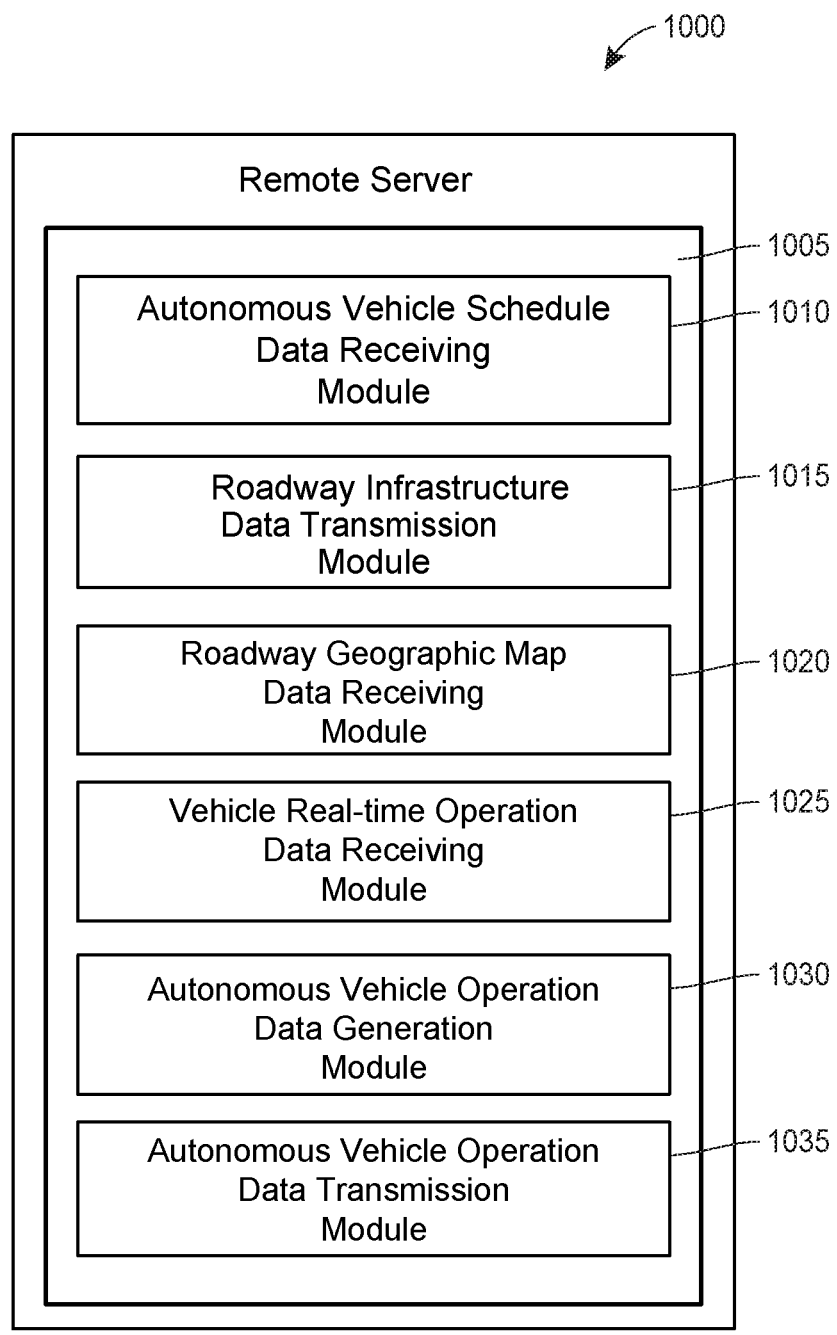
FIG. 10 depicts a block diagram of an example remote server for use within the vehicle roadway traffic density management system of FIG. 3.

With reference to FIG. 10, a remote server 1000 may include an autonomous vehicle schedule data receiving module 1010, an autonomous vehicle schedule data transmission module 1015, a roadway geographic map data receiving module 1020, a vehicle real-time operation data receiving module 1025, an autonomous vehicle operation data generation module 1030, and an autonomous vehicle operation data transmission module 1035 stored on, for example, a memory 1005 as a computer-readable set on instructions. The remote server 1000 may be similar to the remote server 335 of FIG. 3, and/or may include additional, less, or alternate functionality, including that discussed elsewhere herein. The modules 1010-1035 may be similar to, for example, the module 337 of FIG. 3. In any event, as described in more detail elsewhere herein, the remote serve 1000 may determine autonomous vehicle operation data.

Figure 11:
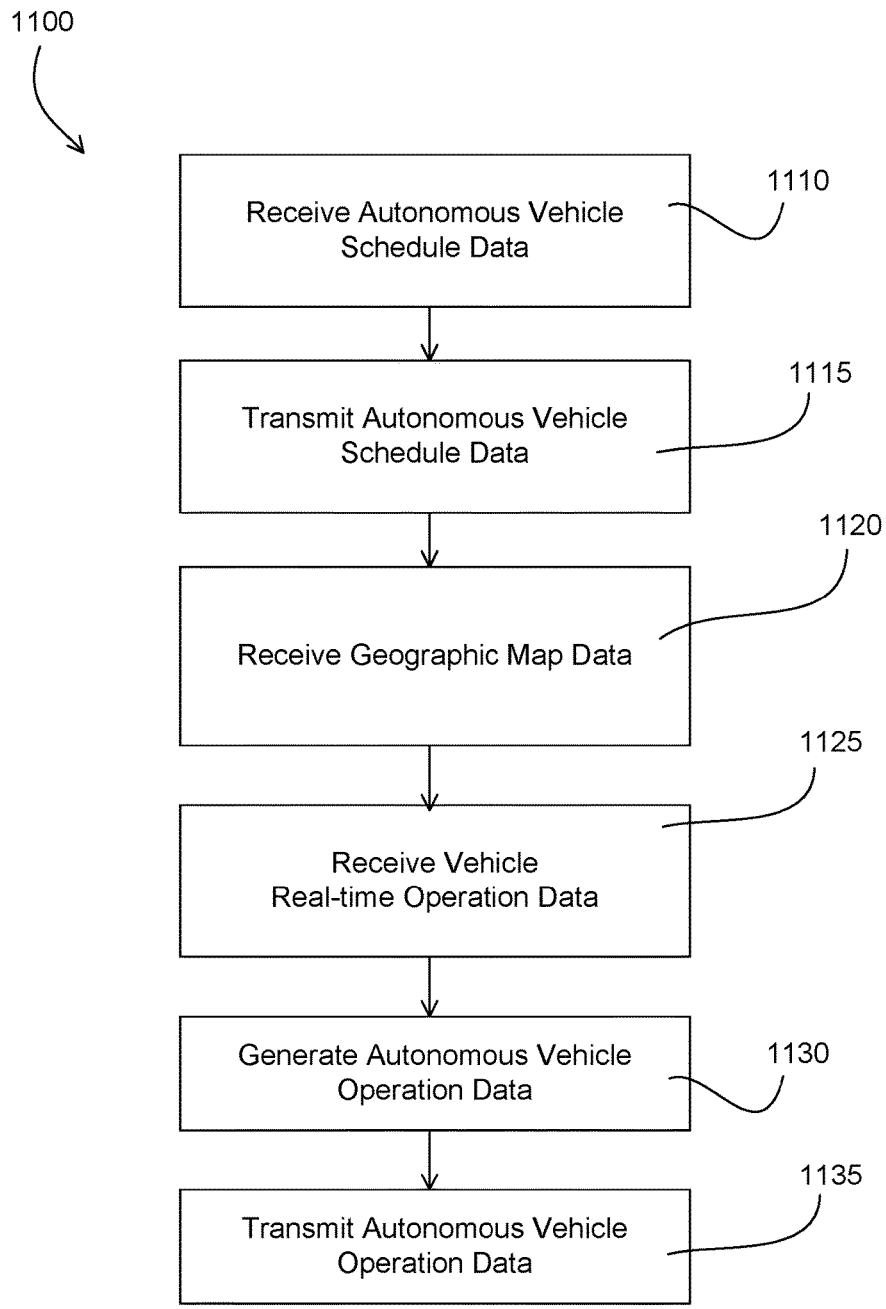
FIG. 11 depicts a flow diagram of an example method of operating the remote server of FIG. 10.

Exemplary Method of Operating a Remote Server for Use within a Traffic Density Management System Turning to FIG. 11, a method of operating a remote server may be implemented by a processor (e.g., processor 338 of remote server 335 of FIG. 3) executing, for example, module 337 or modules 1010-1035 of FIG. 10. In particular, the processor 338 may execute the autonomous vehicle schedule data receiving module 1010 to cause the processor 338 to receive autonomous vehicle schedule data from, for example, a schedule entry device 305, 400 or a vehicle device 315, 600 (block 1110). The processor 338 may execute an autonomous vehicle schedule data transmission module 1015 to cause the processor 338 to, for example, transmit autonomous vehicle schedule data to, for example, a schedule entry device 305, 400, a vehicle device 315, 600 and/or a computing device 325, 800 (block 1115).

Processor 338 may execute a roadway geographic map data receiving module 1020 to cause the processor 338 to, for example, receive roadway geographic map data from, for example, a roadway map database (e.g., roadway map database 340 of FIG. 3) (block 1120). The processor 338 may execute a vehicle real-time operation data receiving module 1025 to cause the processor 338 to receive vehicle real-time operation data from, for example, a vehicle device 315, 600 (block 1125). The vehicle real-time operation data may be representative of, for example, an associated vehicle speed, proximity of an associated vehicle to another vehicle/object, an associated vehicle geographic location, etc.

The processor 338 may execute an autonomous vehicle operation data generation module 1030 to cause the processor 338 to, for example, generate autonomous vehicle operation data (block 1130). The autonomous vehicle operation data may be based on the autonomous vehicle schedule data, the vehicle real-time operation data and/or the roadway geographic map data. The autonomous vehicle operation data may be representative of a desire autonomous vehicle speed, a desired autonomous vehicle steering wheel angle, activation of an autonomous vehicle brake, a desire autonomous vehicle geographic location, a desired vehicle traffic density within a particular roadway lane of traffic, etc. The processor 338 may execute an autonomous vehicle operation data transmission module 1035 to cause the processor 338 to, for example, transmit the autonomous vehicle operation data to a schedule entry device 305, 400, a vehicle device 315, 600, and/or a computing device 325, 800 (block 1135). The method 1100 may include additional, fewer, or alternate actions, including those discussed elsewhere herein.

Technical Advantages

The aspects described herein may be implemented as part of one or more computer components (such as a schedule entry device and/or a vehicle device) and/or one or more back-end components (such as a computing device and/or a remote server), for example. Furthermore, the aspects described herein may be implemented as part of a computer network architecture and/or a computing architecture that facilitates communications between various other devices and/or components. Thus, the aspects described herein address and solve issues of a technical nature that are necessarily rooted in computer technology.

For instance, some aspects include analyzing various sources of data to determine automatic autonomous vehicle operation based on vehicle roadway traffic density. Once this is determined, the aspects may also allow for a determination of whether the vehicle roadway traffic density has changed. In doing so, the aspects may overcome issues associated with the inconvenience of manual and/or unnecessary autonomous vehicle operation. Without the improvements suggested herein, additional processing and memory usage may be required to perform such vehicle operation, as a vehicle device may need to download additional data and process this data as part of the automatic autonomous vehicle operation.

Furthermore, the embodiments described herein may function to optimize automatic operation of autonomous vehicles based on desired vehicle roadway traffic density. The process may improve upon existing technologies by more accurately forecasting vehicle roadway traffic density using additional data sources. Due to this increase in accuracy, the aspects may address computer-related issues regarding efficiency over the traditional amount of processing power and models used to operate autonomous vehicles. Thus, the aspects may also address computer related issues that are related to efficiency metrics, such as consuming less power, for example.

Additional Considerations

This detailed description is to be construed as exemplary only and does not describe every possible embodiment, as describing every possible embodiment would be impractical, if not impossible. One may implement numerous alternate embodiments, using either current technology or technology developed after the filing date of this application.

Further to this point, although the embodiments described herein may utilize credit card information, as an example of sensitive information, the embodiments described herein are not limited to such examples. Instead, the embodiments described herein may be implemented in any suitable environment in which it is desirable to identify and control specific types of information. For example, the aforementioned embodiments may be implemented by a governmental agency that operates autonomous vehicles, etc. To provide another example, the aforementioned embodiments may be implemented by an autonomous vehicle operator to not only identify, re-route, and quarantine autonomous vehicle information, but to apply similar techniques to prevent the dissemination of autonomous vehicle operation data that is preferably delivered in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including modules, computer-readable instructions, logic or a number of routines, subroutines, applications, or instructions. These may constitute either software (e.g., code embodied on a machine-readable medium or in a transmission signal) or hardware. In hardware, the modules, routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of some of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "generating," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A vehicle roadway traffic density management system, the system comprising:

a transceiver configured to communicate via at least one communication network;

a memory storing a set of computer-executable instructions; and a processor interfacing with the transceiver and the memory, and configured to execute the set of computer-executable instructions to cause the processor to:

receive, via the transceiver, autonomous vehicle schedule data associated with an autonomous vehicle from at least one of: a schedule entry device, a remote server, or a vehicle device, wherein the autonomous vehicle schedule data is representative of an autonomous vehicle driving route extending from an autonomous vehicle current geographic location to an autonomous vehicle destination geographic location, receive, via the transceiver, roadway geographic map data from a remote server, wherein the roadway geographic map data is representative of various roadways that extend between the autonomous vehicle current geographic location and the autonomous vehicle geographic destination, receive, via the transceiver, vehicle real-time operation data from at least one of: a vehicle, or a remote server, wherein the vehicle real-time operation data is representative of a vehicle current geographic location, a vehicle driving route, a vehicle geographic destination, or a vehicle speed, generate autonomous vehicle operation data based on the autonomous vehicle schedule data, the roadway geographic map data, and the vehicle real-time operation data, wherein the autonomous vehicle operation data is representative of a primary autonomous vehicle route that requires a least amount of time for the autonomous vehicle to travel from the autonomous vehicle current geographic location to the autonomous vehicle destination geographic location, and transmit, via the transceiver, the autonomous vehicle operation data to the autonomous vehicle, where operation of the autonomous vehicle is automatically controlled according to the autonomous vehicle operation data.

2. The system of claim 1, wherein the vehicle real-time operation data is received from the autonomous vehicle, and wherein the vehicle real-time operation data is representative of real-time operation of a non-autonomous vehicle proximate the autonomous vehicle.

3. The system of claim 1, wherein the vehicle real-time operation data is received from the autonomous vehicle, and wherein the vehicle real-time operation data is representative of real-time operation of the autonomous vehicle.

4. The system of claim 1, further comprising:
receive, via the transceiver, roadway geographic map data from the remote server, wherein the roadway geographic map data is representative of various roadways that extend between the autonomous vehicle current geographic location and the autonomous vehicle geographic destination, and wherein the autonomous vehicle operation data is further based on the roadway geographic map data.

5. The system of claim 1, wherein the autonomous vehicle schedule data is further representative of whether at least one of: an autonomous vehicle passenger, an autonomous vehicle owner, an autonomous vehicle operator, an autonomous vehicle customer, or an autonomous vehicle remote user, is willing to accept an alternative autonomous vehicle route, wherein the alternative autonomous vehicle route requires more time than the primary autonomous vehicle route.

6. The system of claim 5, wherein whether the at least one of: the autonomous vehicle passenger, the autonomous vehicle owner, the autonomous vehicle operator, the autonomous vehicle customer, or the autonomous vehicle remote user, is willing to accept an alternative autonomous vehicle route is based on at least one of: an estimate of traffic density, a traffic flow rate, an average speed that is above a free traffic flow threshold, an average speed that is above a synchronized traffic flow threshold, an average speed that is above a wide moving traffic jam threshold, aggregated telematics data, aggregated telematics data that indicates a wide moving traffic jam, or aggregated telematics data that indicates that a transition from a synchronized traffic flow to a wide moving traffic jam is likely to occur.

7. The system of claim 5, wherein at least one of: an autonomous vehicle speed, an autonomous vehicle braking frequency, an autonomous vehicle braking intensity, an autonomous vehicle acceleration frequency, an autonomous vehicle acceleration intensity, an autonomous vehicle lane, an autonomous vehicle lane change frequency, an autonomous vehicle lane change intensity, or an autonomous vehicle following distance when driving in congested traffic, is altered in order to at least one of: reduce a likelihood of wide moving traffic jam, mitigate an existing wide moving traffic jam, reduce a likelihood of a phantom traffic jam caused by variations in vehicle speeds that result in over-braking and reduced speeds, or mitigate an existing phantom traffic jam caused by variations in vehicle speeds that result in over-braking and reduced speeds.

8. The system of claim 1, further comprising:
transmit, via the transceiver, the autonomous vehicle operation data to the remote server.

9. The system of claim 1, further comprising:
transmit, via the transceiver, the autonomous vehicle schedule data to the remote server.

10. A non-transitory computer-readable medium including computer readable instructions that, when executed by a processor, cause the processor to implement a vehicle roadway traffic density management system, the non-transitory computer-readable medium comprising:
an autonomous vehicle schedule data receiving module that, when executed by a processor, causes the processor to receive autonomous vehicle schedule data associated with an autonomous vehicle from at least one of: a schedule entry device, a remote server, or a vehicle device, wherein the autonomous vehicle schedule data is representative of an autonomous vehicle driving route extending from an autonomous vehicle current geographic location to an autonomous vehicle geographic destination;
a roadway geographic map data receiving module that, when executed by a processor, causes the processor to receive roadway geographic map data from a remote server, wherein the roadway geographic map data is representative of various roadways that extend between the autonomous vehicle current geographic location and the autonomous vehicle geographic destination;
a vehicle real-time operation data receiving module that, when executed by a processor, causes the processor to receive vehicle real-time operation data from at least one of: a vehicle, or a remote server, wherein the vehicle real-time operation data is representative of a vehicle current geographic location, a vehicle driving route, a vehicle geographic destination, or a vehicle speed; and
an autonomous vehicle operation data generation module that, when executed by a processor, causes the processor to generate autonomous vehicle operation data based on the autonomous vehicle schedule data, the roadway geographic map data, and the vehicle real-time operation data, wherein an autonomous vehicle is automatically operated based on the autonomous vehicle operation data.

11. The non-transitory computer-readable medium of claim 10, wherein the vehicle real-time operation data is received from the autonomous vehicle, and wherein the vehicle real-time operation data is representative of real-time operation of a non-autonomous vehicle proximate the autonomous vehicle.

12. The non-transitory computer-readable medium of claim 10, wherein the vehicle real-time operation data is received from the autonomous vehicle, and wherein the vehicle real-time operation data is representative of real-time operation of the autonomous vehicle.

13. The non-transitory computer-readable medium of claim 10, further comprising:
a roadway geographic map data transmission module that, when executed by a processor, causes the processor to transmit the roadway geographic map data to a vehicle computing device.

14. The non-transitory computer-readable medium of claim 10, wherein the autonomous vehicle schedule data is further representative of whether at least one of: an autonomous vehicle passenger, an autonomous vehicle owner, an autonomous vehicle operator, an autonomous vehicle customer, or an autonomous vehicle remote user, is willing to accept an alternative autonomous vehicle route, and wherein the alternative autonomous vehicle route requires more time than a primary autonomous vehicle route.

15. The non-transitory computer-readable medium of claim 14, wherein whether the at least one of: the autonomous vehicle passenger, the autonomous vehicle owner, the autonomous vehicle operator, the autonomous vehicle customer, or the autonomous vehicle remote user, is willing to accept an alternative autonomous vehicle route is based on at least one of: an estimate of traffic density, a traffic flow rate, an average speed that is above a free traffic flow threshold, an average speed that is above a synchronized traffic flow threshold, an average speed that is above a wide moving traffic jam threshold, aggregated telematics data, aggregated telematics data that indicates a wide moving traffic jam, or aggregated telematics data that indicates that a transition from a synchronized traffic flow to a wide moving traffic jam is likely to occur.

16. The non-transitory computer-readable medium of claim 14, wherein at least one of: an autonomous vehicle speed, an autonomous vehicle braking frequency, an autonomous vehicle braking intensity, an autonomous vehicle acceleration frequency, an autonomous vehicle acceleration intensity, an autonomous vehicle lane, an autonomous vehicle lane change frequency, an autonomous vehicle lane change intensity, or an autonomous vehicle following distance when driving in congested traffic, is altered in order to at least one of: reduce a likelihood of wide moving traffic jam, mitigate an existing wide moving traffic jam, reduce a likelihood of a phantom traffic jam caused by variations in vehicle speeds that result in over-braking and reduced speeds, or mitigate an existing phantom traffic jam caused by variations in vehicle speeds that result in over-braking and reduced speeds.

17. The non-transitory computer-readable medium of claim 10, further comprising:
an autonomous vehicle operation data transmission module that, when executed by a processor, causes the processor to transmit the autonomous vehicle operation data to the remote server.

18. The non-transitory computer-readable medium of claim 10, further comprising:
an autonomous vehicle schedule data transmission module that, when executed by a processor, causes the processor to transmit the autonomous vehicle schedule data to the remote server.

19. A vehicle roadway traffic density management method, the method comprising:
receiving, at a processor of a computing device, autonomous vehicle schedule data associated with an autonomous vehicle from at least one of: a schedule entry device, a remote server, or a vehicle device, wherein the autonomous vehicle schedule data is representative of at least one of: an autonomous vehicle current geographic location, an autonomous vehicle driving route, or an autonomous vehicle geographic destination, and wherein the autonomous vehicle schedule data is further representative of whether at least one of: an autonomous vehicle passenger, an autonomous vehicle owner, an autonomous vehicle operator, an autonomous vehicle customer, or an autonomous vehicle remote user, is willing to accept an alternative autonomous vehicle route;
receiving, at the processor of the computing device, roadway geographic map data from a remote server, wherein the roadway geographic map data is representative of various roadways that extend between the autonomous vehicle current geographic location and the autonomous vehicle geographic destination;
receiving, at the processor of the computing device, vehicle real-time operation data from at least one of: a vehicle, or a remote server, wherein the vehicle real-time operation data is representative of a vehicle current geographic location, a vehicle driving route, a vehicle geographic destination, or a vehicle speed; and
generating, using the processor of the computing device, autonomous vehicle operation data based on the autonomous vehicle schedule data, the roadway geographic map data, and the vehicle real-time operation data, wherein the autonomous vehicle operation data is representative of a primary autonomous vehicle route that requires a least amount of time for the autonomous vehicle to travel from the autonomous vehicle current geographic location to the autonomous vehicle geographic destination and an alternative autonomous vehicle route that requires more time than the primary autonomous vehicle route, and wherein the autonomous vehicle is automatically operated based on the autonomous vehicle operation data.

20. The method of claim 19, wherein the vehicle real-time operation data is received from the autonomous vehicle, and wherein the vehicle real-time operation data is representative of real-time operation of a non-autonomous vehicle proximate the autonomous vehicle.

21. The method of claim 19, wherein the vehicle real-time operation data is received from the autonomous vehicle, and wherein the vehicle real-time operation data is representative of real-time operation of the autonomous vehicle.

22. The method of claim 19, wherein the autonomous vehicle schedule data is further representative of whether at least one of: an autonomous vehicle passenger, an autonomous vehicle owner, an autonomous vehicle operator, an autonomous vehicle customer, or an autonomous vehicle remote user, is willing to accept an alternative autonomous vehicle route, and wherein the alternative autonomous vehicle route requires more time than a primary autonomous vehicle route.

23. The method of claim 22, wherein whether the at least one of: the autonomous vehicle passenger, the autonomous vehicle owner, the autonomous vehicle operator, the autonomous vehicle customer, or the autonomous vehicle remote user, is willing to accept an alternative autonomous vehicle route is based on at least one of: an estimate of traffic density, a traffic flow rate, an average speed that is above a free traffic flow threshold, an average speed that is above a synchronized traffic flow threshold, an average speed that is above a wide moving traffic jam threshold, aggregated telematics data, aggregated telematics data that indicates a wide moving traffic jam, or aggregated telematics data that indicates that a transition from a synchronized traffic flow to a wide moving traffic jam is likely to occur.

24. The method of claim 22, wherein at least one of: an autonomous vehicle speed, an autonomous vehicle braking frequency, an autonomous vehicle braking intensity, an autonomous vehicle acceleration frequency, an autonomous vehicle acceleration intensity, an autonomous vehicle lane, an autonomous vehicle lane change frequency, an autonomous vehicle lane change intensity, or an autonomous vehicle following distance when driving in congested traffic, is altered in order to at least one of: reduce a likelihood of wide moving traffic jam, mitigate an existing wide moving traffic jam, reduce a likelihood of a phantom traffic jam caused by variations in vehicle speeds that result in over-braking and reduced speeds, or mitigate an existing phantom traffic jam caused by variations in vehicle speeds that result in over-braking and reduced speeds.

25. The method of claim 19, further comprising:
transmitting, using a processor of a computing device, the autonomous vehicle operation data to a remote server.

26. The method of claim 19, further comprising:
transmitting, using a processor of a computing device, the autonomous vehicle schedule data to a remote server.

* * * * *